(12) United States Patent
Webber

(10) Patent No.: US 8,814,201 B2
(45) Date of Patent: Aug. 26, 2014

(54) KNEE AIRBAG HAVING INCREASED PACKAGE WIDTH

(75) Inventor: James Webber, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/588,085

(22) Filed: Aug. 17, 2012

(65) Prior Publication Data

US 2014/0049026 A1 Feb. 20, 2014

(51) Int. Cl.
*B60R 21/206* (2011.01)

(52) U.S. Cl.
USPC ..................... 280/730.1; 280/743.2

(58) Field of Classification Search
USPC ........................... 280/730.1, 743.2
See application file for complete search history.

(56) References Cited

U.S. PATENT DOCUMENTS

| | | | |
|---|---|---|---|
| 3,618,978 A * | 11/1971 | Klove et al. | 280/730.1 |
| 3,784,223 A * | 1/1974 | Hass et al. | 280/730.1 |
| 3,801,126 A * | 4/1974 | Knight et al. | 280/732 |
| 3,897,961 A | 8/1975 | Leising et al. | |
| 5,348,341 A * | 9/1994 | Webber | 280/728.1 |
| 5,364,124 A * | 11/1994 | Donegan et al. | 280/730.1 |
| 6,176,509 B1 | 1/2001 | Kawaguchi et al. | |
| 6,916,039 B2 * | 7/2005 | Abe | 280/729 |
| 7,175,195 B2 * | 2/2007 | Morita | 280/730.1 |
| 7,182,365 B2 * | 2/2007 | Takimoto et al. | 280/730.1 |
| 7,213,834 B2 * | 5/2007 | Mizuno et al. | 280/730.1 |
| 7,232,149 B2 * | 6/2007 | Hotta et al. | 280/730.1 |
| 7,370,879 B2 * | 5/2008 | Hotta et al. | 280/728.2 |
| 7,600,784 B2 * | 10/2009 | Kashiwagi | 280/743.2 |
| 7,669,895 B2 * | 3/2010 | Abe et al. | 280/743.2 |
| 7,712,771 B2 * | 5/2010 | Freisler et al. | 280/730.1 |
| 7,744,118 B2 * | 6/2010 | Takimoto et al. | 280/730.1 |
| 7,766,374 B2 * | 8/2010 | Abele et al. | 280/730.1 |
| 7,837,229 B2 * | 11/2010 | Ishida et al. | 280/743.1 |
| 7,850,198 B2 * | 12/2010 | Hayakawa et al. | 280/730.1 |
| 7,878,540 B2 * | 2/2011 | Takimoto et al. | 280/743.2 |
| 7,891,700 B2 * | 2/2011 | Ishida | 280/730.1 |
| 7,963,550 B2 * | 6/2011 | Hong et al. | 280/730.1 |
| 8,083,254 B2 * | 12/2011 | Enders et al. | 280/728.2 |
| 8,118,325 B2 * | 2/2012 | Enders et al. | 280/730.1 |
| 8,220,830 B2 * | 7/2012 | Takimoto et al. | 280/730.1 |
| 8,272,667 B2 * | 9/2012 | Schneider et al. | 280/730.1 |
| 8,302,991 B2 * | 11/2012 | Hong et al. | 280/730.1 |
| 8,360,464 B2 * | 1/2013 | Enders | 280/730.1 |
| 8,408,589 B2 * | 4/2013 | Fukawatase et al. | 280/728.3 |
| 2004/0178607 A1 | 9/2004 | Kawauchimaru et al. | |

(Continued)

FOREIGN PATENT DOCUMENTS

EP 1 310 408 A2 5/2003

*Primary Examiner* — Nicole Verley
(74) *Attorney, Agent, or Firm* — Ralph E. Smith

(57) ABSTRACT

A knee airbag assembly is operable to restrain at least one leg of an occupant of a vehicle. The assembly includes an inflator, a housing, and an airbag that moves between a stowed state and a deployed state. The inflator is operable to selectively inflate the airbag to move the airbag from the stowed state to the deployed state. The airbag is housed within the housing in the stowed state, and the airbag extends from the housing in the deployed state. The airbag defines a package width when in the stowed state, and the airbag defines a deployed width when in the deployed state. A ratio of the package width to the deployed width is between approximately 0.8 and 1.0.

17 Claims, 5 Drawing Sheets

(56) References Cited

U.S. PATENT DOCUMENTS

| | | | |
|---|---|---|---|
| 2004/0251665 A1* | 12/2004 | Kumagai | 280/730.1 |
| 2005/0116449 A1* | 6/2005 | Enders | 280/730.1 |
| 2005/0151351 A1* | 7/2005 | Enders et al. | 280/730.1 |
| 2008/0252051 A1 | 10/2008 | Sarmiento et al. | |
| 2009/0085333 A1* | 4/2009 | Imaeda et al. | 280/730.1 |
| 2011/0241319 A1* | 10/2011 | Chavez | 280/730.1 |
| 2012/0049488 A1* | 3/2012 | Enders | 280/728.3 |
| 2012/0049497 A1* | 3/2012 | Enders | 280/743.1 |

* cited by examiner

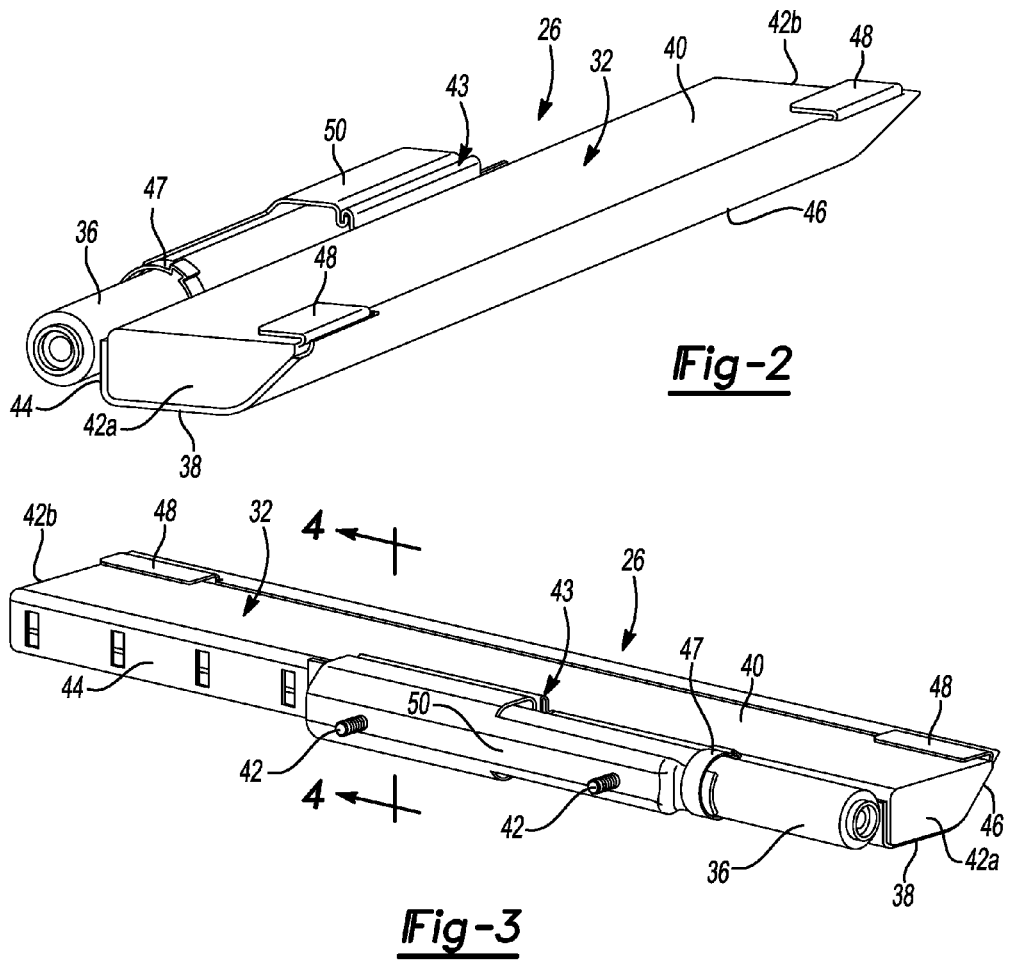
*Fig-2*
*Fig-3*
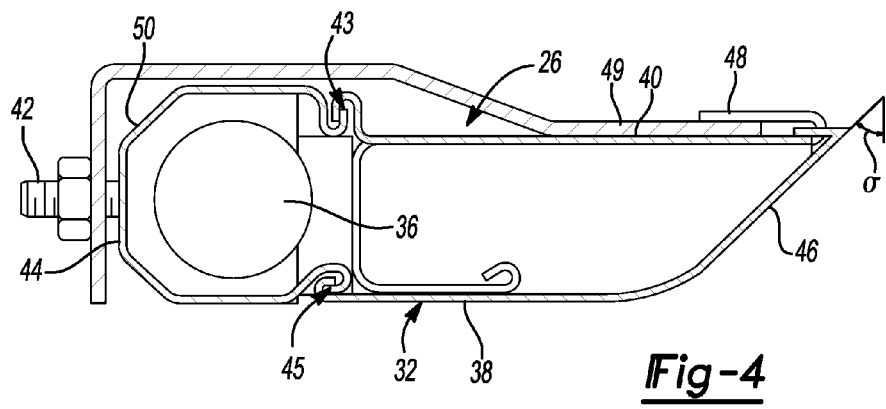
*Fig-4*

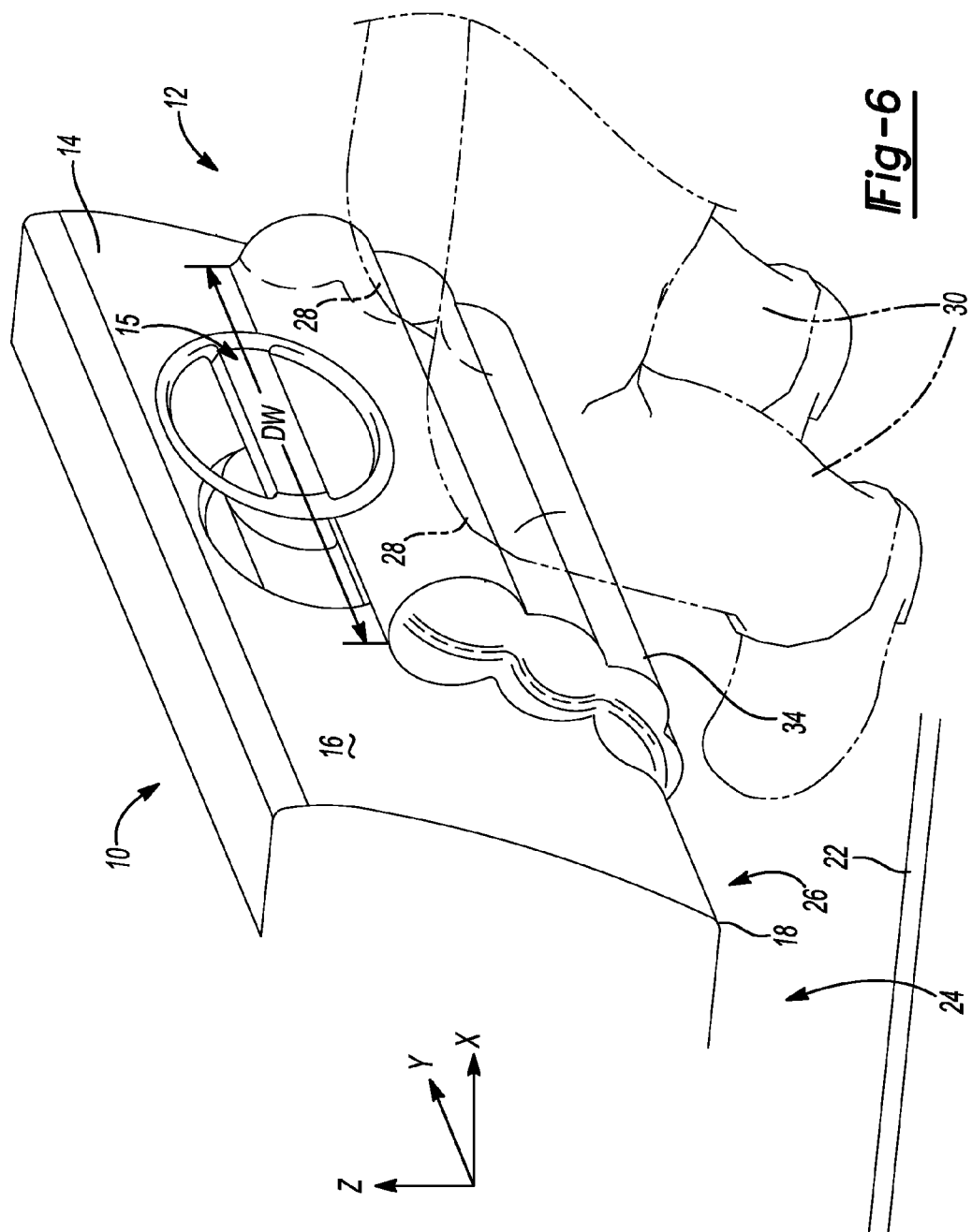

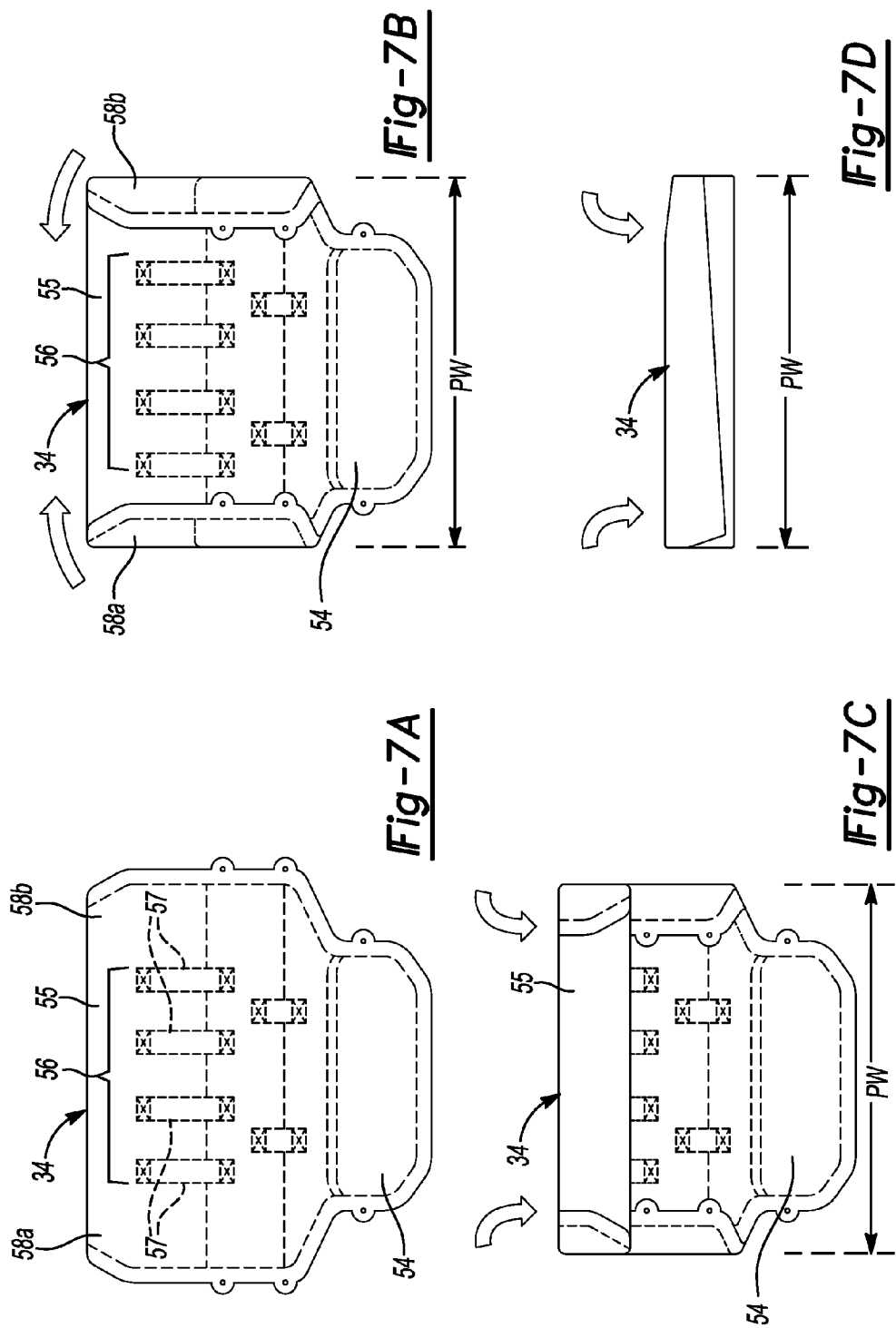

KNEE AIRBAG HAVING INCREASED PACKAGE WIDTH

FIELD

The present disclosure relates to a knee airbag that is operable to restrain the knees of a vehicle occupant and, more particularly, to a knee airbag having an increased package width.

BACKGROUND

Many types of airbag systems have been proposed that restrain the body parts of a vehicle occupant during a collision. These systems typically include an airbag that is housed within a housing and an inflator that selectively provides fluid to inflate the airbag. During a collision, the occupant's inertia tends to cause the occupant's body to move. However, the collision triggers the inflator to inflate the airbag, and the occupant's body can be decelerated, cushioned, and restrained from excess movement by the airbag.

Some airbag systems are adapted to restrain the knees and lower legs of the occupant (i.e., "knee airbags"). These knee airbags can be mounted in various positions relative to the instrument panel and/or relative to the occupant's seat. Thus, during a collision, the airbag can inflate toward the occupant's knees and lower legs to restrain movement of the knees and/or lower legs.

SUMMARY

A knee airbag assembly is disclosed that is operable to restrain at least one leg of an occupant of a vehicle. The assembly includes an inflator, a housing, and an airbag that moves between a stowed state and a deployed state. The inflator is operable to selectively inflate the airbag to move the airbag from the stowed state to the deployed state. The airbag is housed within the housing in the stowed state, and the airbag extends from the housing in the deployed state. The airbag defines a package width when in the stowed state, and the airbag defines a deployed width when in the deployed state. A ratio of the package width to the deployed width is between approximately 0.8 and 1.0.

Additionally, a method of restraining at least one leg of an occupant of a vehicle is disclosed. The method includes providing a housing and an airbag that is operable to move between a stowed state and a deployed state. The airbag is housed within the housing in the stowed state, and the airbag extends from the housing in the deployed state. The airbag defines a package width when in the stowed state, and the airbag defines a deployed width when in the deployed state. Also, the method includes moving the airbag from the stowed state to the deployed state such that a ratio of the package width to the deployed width is between approximately 0.8 and 1.0.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a perspective view of the knee airbag assembly of FIG. 1, wherein the airbag is shown in its stowed state;

FIG. 3 is a perspective view of the knee airbag assembly of FIG. 1, wherein the airbag is shown in its stowed state;

FIG. 4 is a section view of the knee airbag assembly taken along the line 4-4 of FIG. 3;

FIG. 6 is a perspective view of the knee airbag assembly of FIG. 1, wherein the airbag is shown in its deployed state; and FIGS. 7A-7D are top views of the airbag of the airbag system showing how the airbag is folded when in its stowed state.

DETAILED DESCRIPTION

Figure 1:
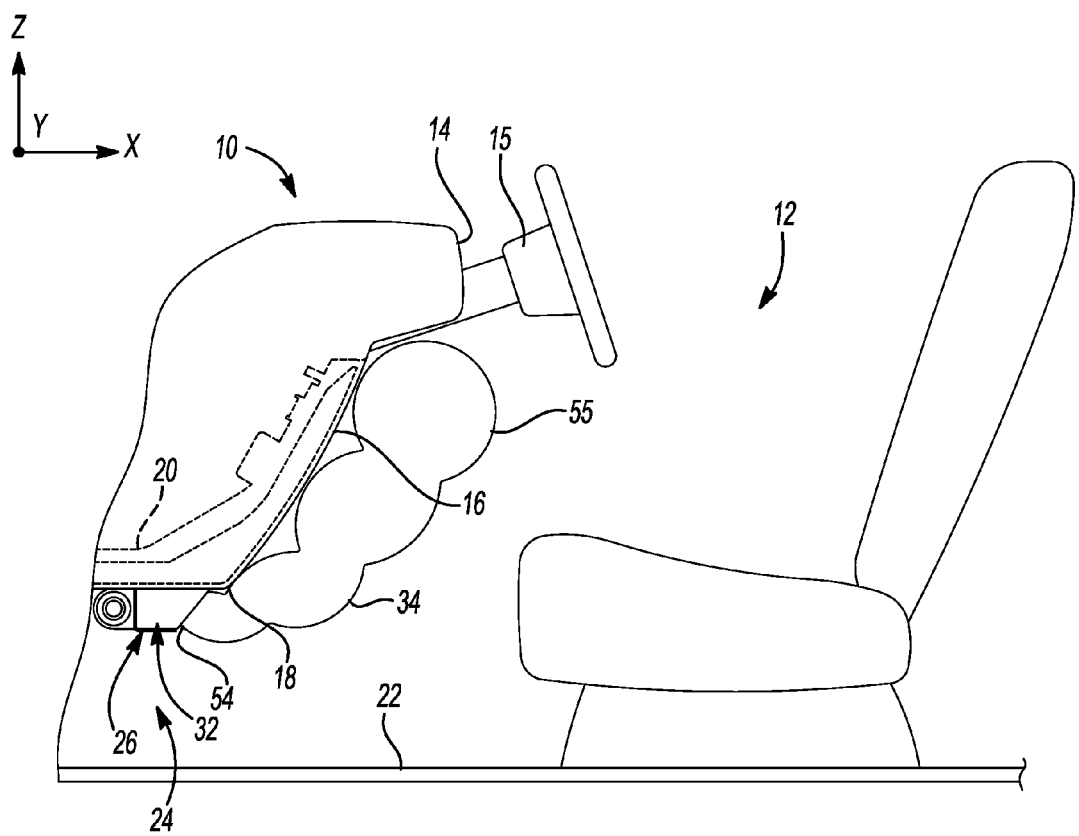
FIG. 1 is a side, inboard view of a front passenger compartment of a vehicle, wherein a knee airbag assembly is shown mounted within the vehicle according to various exemplary embodiments of the present disclosure, and wherein a knee airbag is shown in its deployed state.
Figure 5:
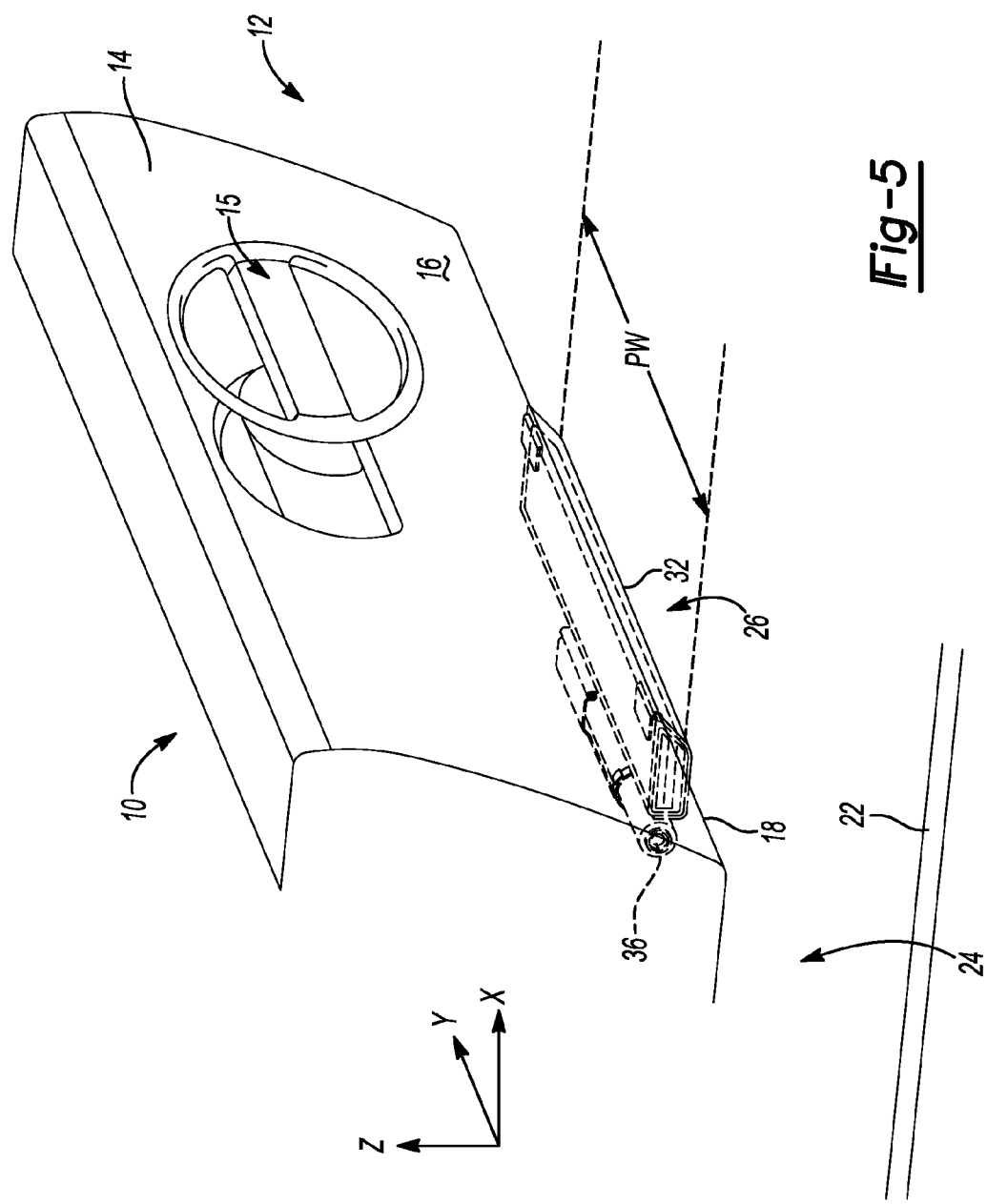
FIG. 5 is a perspective view of the knee airbag assembly of FIG. 1, wherein the airbag is shown in its stowed state.

Referring initially to FIGS. 1, 5, and 6, a portion of a vehicle 10 (e.g., car, truck, van, etc.) is illustrated. Specifically, a front passenger compartment 12 of the vehicle 10 is shown. For purposes of discussion, it is noted that the vehicle 10 defines a vertical direction Z, a forward/rearward direction X, and an inboard/outboard direction Y (see FIGS. 1 and 6)

As shown, the front passenger compartment 12 can be defined by an instrument panel assembly 14. The instrument panel assembly 14 can include one or more panels that span the width of the vehicle 10 and that include various control buttons, knobs, or other input devices for controlling the various subsystems of the vehicle 10. Also, a steering wheel 15 can extend rearward from the instrument panel assembly 14. Moreover, the instrument panel assembly 14 can include a knee bolster panel 16 which terminates at a lowermost edge 18. The knee bolster panel 16 can be supported by an internal support structure 20 (shown in phantom in FIG. 1) that is disposed forward relative to the knee bolster panel 16. More specifically, the support structure 20 can include rigid beams, brackets, and other high-strength structures, and the knee bolster panel 16 can include one or more panels that are attached to the support structure 20 to partially define the front passenger compartment 12.

The instrument panel assembly 14 can be disposed above a floor 22 of the vehicle 10. Also, a foot well 24 can be defined between the instrument panel assembly 14 and the floor 22. It will be appreciated that the foot well 24 can receive and accommodate an occupant's feet (FIG. 6) when sitting in the front passenger compartment 12. It will also be appreciated that the occupant's knees 28 and lower legs 30 (FIG. 6) will likely be disposed immediately rearward relative to the knee bolster panel 16 when sitting in the front passenger compartment 12. Thus, in the event of a front end vehicular collision, inertia can cause the occupant's knees 28 and lower legs 30 (e.g., shins) to travel generally toward the knee bolster panel 16.

To restrain the occupant's knees 28 and/or lower legs 30, the vehicle 10 can include a knee airbag assembly 26 (FIGS. 1-6). The assembly 26 can generally include a housing 32, an airbag 34, and an inflator 36. The airbag 34 can move between a stowed state (FIGS. 2-5) and a deployed state (FIGS. 1 and 6). When in the stowed state, the airbag 34 can be deflated, folded, and housed within the housing 32. Also, the inflator 36 can be of a known type that operates to selectively inflate the airbag 34 from the stowed state to the deployed state. In the process of inflating, the airbag 34 can initially extend from the housing 32 in the rearward direction (X) and can eventually "turn" upward in the vertical direction (Z) (see FIG. 1) to be disposed between the knee bolster panel 16 and the occupant's knees 28 and lower legs 30 (FIG. 6). Accordingly, the airbag 34 can deploy to cushion and restrain movement of the knees 28 and lower legs 30 toward the knee bolster panel 16.

As will be discussed, the airbag 34 can define a package width PW when in the stowed state (FIG. 5), and the airbag 34 can define a deployed width DW when in the deployed state (FIG. 6). In some embodiments, a ratio of the package width PW to the deployed width DW can be between approximately 0.8 and 1.0. Thus, the direction of inflation of the airbag 34 is primarily in rearward direction (X) and vertical direction (Z), but there can be relatively little expansion of the airbag 34 in the inboard/outboard direction (Y) during deployment. As a result, the deployed airbag 34 is likely to be in a desirable position for restraining the occupant's knees 28 and/or lower legs 30. Moreover, because of this ratio, PW:DW, the airbag assembly 26 can be relatively compact, such that the airbag assembly 26 is unlikely to interfere with surrounding structures (e.g., the glove box, etc.) and/or such that the airbag assembly 26 can be more inconspicuous.

Before discussing specific details of the airbag assembly 26, it is noted that the knee airbag assembly 26 can be located in any suitable position in the vehicle 10 (e.g., on either the driver or passenger side of the forward compartment 12). For instance, if the knee airbag assembly 26 is located on the driver side, then the housing 32 of the knee airbag assembly 26 can be located below the knee bolster panel 16, below the steering wheel 15, and forward of the lowermost edge 18 as shown in FIG. 1. If the assembly 26 is located on the passenger side, the housing 32 can be similarly located, except the housing 32 can be disposed below the knee bolster panel 16 below the glove box (not shown) of the vehicle 10. Also, the airbag assembly 26 can be operable for restraining only one of the occupant's knees 28 and/or only one of the occupant's lower legs 30. Furthermore, the airbag assembly 26 can be configured for restraining knees 28 and/or lower legs 30 of multiple occupants at the same time.

Referring now to FIGS. 2-4, the housing 32 will be discussed in detail. The housing 32 can be generally elongate and box-shaped. The housing 32 can define a bottom face 38, a top face 40, inboard/outboard faces 42a, 42b, a forward face 44, and a rear face 46, and each of these faces 38, 40, 42a, 42b, 44, 46 can be substantially planar. The bottom face 38 and the top face 40 can be parallel to each other and perpendicular to the inboard/outboard faces 42a, 42b. The forward face 44 can be perpendicular to the top and bottom faces 40, 38. Also, the rear face 46 can be disposed at an acute angle θ relative to the forward face 44 (FIG. 4). Stated differently, the rear face 46 can be disposed relative to the vertical direction (Z) such that a lower edge of the rear face 46 is disposed closer to the forward end of the vehicle than an upper edge of the rear face 46.

Also, the housing 32 can include a plurality of hooks 48 that extend generally from the intersection of the top face 40 and the rear face 46 and that project therefrom along the top face 40. In the illustrated embodiments, there are two hooks 48 that are spaced and disposed at respective ends of the top face 40. Moreover, the housing 32 can include a forward bracket 50 that extends generally from the intersection of the forward face 44 and the top face 40. The forward bracket 50 can be substantially centered with respect to the forward face 44. Also, as shown in FIG. 4, the forward bracket 50 can be hooked onto the top face 40 (i.e., at a top hook coupling 43), and the forward bracket 50 can be hooked onto the bottom face 38 (i.e., at a bottom hook coupling 45). The inflator 36 can be received between the forward bracket 50 and the forward face 44. Additionally, a strap 47 can extend from the forward face 44 and can encircle both the inflator 36 and the forward bracket 50. As such, the inflator 36 can be supported and attached to the housing 32 via the forward bracket 50.

To attach the housing 32 to the vehicle 10, the hooks 48 can hook onto a support panel 49 of the vehicle 10 as shown in FIG. 4. (The support panel 49 is part of the support structure 20 (FIG. 1) that supports the knee bolster panel 16.) Moreover, the assembly 26 can include one or more fasteners 42 (e.g., bolts) that fasten the forward bracket 50 to a support panel 53 of the vehicle 10. As shown in FIG. 4, the fasteners 42 can extend substantially in fore/aft direction (X).

The airbag 34 will now be discussed in detail. The airbag 34 can be made out of flexible material that defines a chamber therein. The chamber can be operatively coupled to the inflator 36 such that the inflator 36 can selectively inflate the airbag 34.

The airbag 34 is shown deflated and spread out (i.e., as a flat panel) in FIG. 7A. The airbag 34 can generally include a base portion 54 and a leading end 55 that are opposite each other. As shown in FIG. 1, the base portion 54 can be fixed with respect to the housing 32, and the leading end 55 can move out of the housing 32 when the airbag 34 is inflated. As shown in FIG. 7A, the leading end 55 can be wider than the base portion 54.

Also, as shown in phantom in FIG. 7A, the leading end 55 can include one or more tethers 57. The tethers 57 can be straps that can be fixed at opposite ends to particular parts of the airbag 34. In the embodiments shown, the tethers 57 extend longitudinally between the leading end 55 and the base portion 54. Also, as shown in FIG. 7A, the tethers 57 can be disposed in a tethered central portion 56 of the leading end 55 of the airbag 34. Moreover, the airbag 34 can define untethered portions 58a, 58b (i.e., areas where there are no tethers) on opposite ends of the tethered central portion 56. As will be discussed in greater detail below, the tethers 57 can direct the path of travel of the airbag 34 as the airbag 34 inflates and moves toward the deployed state.

In order to fold the airbag 34 and position the airbag 34 inside the housing 32 in the stowed position, the airbag 34 can be first spread out as shown in FIG. 7A. Then, the untethered portions 58a, 58b can be folded toward each other and folded over the tethered central portion 56 so as to overlap the tethered central portion 56 as shown in FIG. 7B. Next, the leading end 55 can be folded partially over the tethered central portion 56 as shown in FIG. 7C, and the base portion 54 can be folded under the tethered central portion as shown in FIG. 7D. Thus, the airbag 34 can have a Z-shaped cross section (e.g., taken half way between the untethered portions 58a, 58b.

It will be appreciated that, once the untethered portions 58a, 58b are folded toward each other as shown in FIG. 7B, the airbag 34 can define the package width PW mentioned above. Also, the folding of the airbag 34 represented in FIGS. 7C and 7D does not significantly change the package width PW. Also, since the untethered portions 58a, 58b do not include tethers, the untethered portions 58a, 58b can be folded over without significantly increasing the thickness of the airbag 34.

Once folded as shown in FIG. 7D, the airbag 34 can be positioned within the housing 32. The housing 32 can have a substantially equal width to the package width PW of the airbag 34 as shown in FIG. 5. The height and length of the housing 32 can also be substantially equal to that of the airbag 34.

Operations of the airbag assembly 26 will now be discussed. Initially, it is assumed that the airbag assembly 26 is installed within the vehicle 10 such that the housing 32 is mounted forward of the lowermost edge 18 of the knee bolster panel 1 in the fore/aft direction (X) (FIG. 1). Also, it is assumed that the airbag 34 is in its stowed state within the housing 32.

If the vehicle 10 impacts an object, the inflator 36 can be triggered (e.g., by a known impact sensor, etc.) to inflate the airbag 34. As the airbag 34 inflates, the airbag 34 can initially move out of the rear face 46 of the housing 32 substantially rearward in the fore/aft direction (X) while remaining below the knee bolster panel 16 in the vertical direction (Z). As the airbag 34 further inflates and bypasses the lowermost edge 18 of the knee bolster panel 16, the tethers 57 can tension to pull and "turn" the airbag 34 generally upwards in the vertical direction (Z). The airbag 34 can further inflate and move generally along the knee bolster panel 16 (i.e., in the rearward and vertical directions (X), (Z)).

As the airbag 34 inflates, the airbag 34 can also increase somewhat in the width direction to the deployed width DW (FIG. 6). Specifically, to inflate from the package width PW (FIG. 5) to the deployed width DW (FIG. 6), the airbag 34 can inflate and the untethered portions 58a, 58b can unfold away from the tethered central portion 56 and away from each other.

A ratio of the package width PW to the deployed width DW (PW:DW) can be between approximately 0.8 and 1.0. For instance, in some embodiments the ratio of the package width PW to the deployed width DW (PW:DW) can be between approximately 0.90 and 0.92 (e.g., approximately 0.091). Accordingly, there can be a relatively small change in the width of the airbag 34 as the airbag 34 deploys. As such, the airbag 34 is likely to span completely between the lateral areas of the occupant's knees 28 and lower legs 30 during deployment. Thus, the airbag 34 is likely to be in an effective position for restraining the occupant's knees 28 and lower legs 30. Moreover, the airbag 34 can inflate to the deployed width DW in a relatively short amount of time such that the airbag 34 can be in position to properly restrain the occupant's knees 28 and lower legs 30.

Also, when the airbag 34 is stowed, the assembly 26 can be compact and inconspicuous. For instance, the assembly 26 can be disposed entirely beneath and forward relative to the knee bolster panel 16. As such, the same airbag assembly 26 can be incorporated within multiple vehicles without having to match the color, shape, etc. of the assembly 26 to the particular knee bolster panel 16. Also, the housing 32 can be relatively compact and is unlikely to intrude or obstruct surrounding structures, such as the knee bolster panel 16, the glove box, etc. For instance, the knee bolster panel 16 or other interior components can be contoured or otherwise shaped, and the relatively compact housing 32 is unlikely to obstruct these features.

Additionally, the housing 32 is likely to be hidden from view from the occupants. For instance, the housing 32 can be out of the line of sight of the occupants in the forward compartment 12, especially because the rear face 46 is angled as shown in FIG. 4. Occupants in the rear of the vehicle might see a small portion of the rear face 46, but the visible portion is likely to be very small.

What is claimed is:

1. A knee airbag assembly that is operable to restrain at least one leg of an occupant of a vehicle comprising:
   an inflator;
   a housing; and
   an airbag that moves between a stowed state and a deployed state, the inflator operable to selectively inflate the airbag to move the airbag from the stowed state to the deployed state, the airbag being housed within the housing in the stowed state, the airbag extending from the housing in the deployed state, the airbag defining a package width when in the stowed state, the airbag defining a deployed width when in a fully deployed state, a ratio of the package width to the deployed width being between approximately 0.8 and 1.0,
   wherein the airbag includes a tethered region and at least one side region that is untethered, the at least one side region being folded over the tethered region when in the stowed position, the at least one side region being unfolded from the tethered region when in the fully deployed position to partially define the fully deployed width.

2. The knee airbag assembly of claim 1, wherein the ratio of the package width to the deployed width is between approximately 0.90 and 0.92.

3. The knee airbag assembly of claim 1, wherein the vehicle defines a fore/aft direction and a vertical direction, wherein the vehicle includes a knee bolster panel, wherein the airbag is operable to move from the stowed state to the deployed state by moving rearward in the fore/aft direction while remaining below the knee bolster panel in the vertical direction, and wherein the airbag is operable to move generally upward in the vertical direction after bypassing the knee bolster panel.

4. The knee airbag assembly of claim 3, wherein the housing is mounted forward of a lowermost edge of the knee bolster panel in the fore/aft direction.

5. The knee airbag assembly of claim 1, wherein the at least one side region includes a first side region and a second side region, the tethered region being disposed between the first and second side regions, the first and second side regions being folded over the tethered region when in the stowed position, the first and second regions being unfolded from the tethered region when in the deployed position to cooperate with the tethered region to define the deployed width.

6. The knee airbag assembly of claim 1, wherein the vehicle defines a vertical direction and a front end, wherein the housing includes a rear face, wherein the airbag moves generally away from the rear face when moving from the stowed position to the deployed position, the rear face being disposed relative to the vertical direction such that a lower edge of the rear face is disposed closer to the forward end of the vehicle than an upper edge of the rear face.

7. The knee airbag assembly of claim 1, wherein the housing includes an upper face and at least one hook that extends along the upper face, the hook operable to hook onto a support structure of the vehicle to mount the housing to the vehicle.

8. The knee airbag assembly of claim 1, wherein the vehicle defines a fore/aft direction, wherein the housing includes a forward bracket, further comprising at least one fastener that fastens the forward bracket to the vehicle, the fastener extending substantially in the fore-aft direction.

9. The knee airbag assembly of claim 1, wherein the vehicle defines a fore/aft direction, and wherein the airbag is operable to move substantially only in the fore/aft direction when initially moving from the stowed position to the deployed position.

10. The knee airbag assembly of claim 1, wherein the airbag defines a fore-aft direction, and at least a portion of the airbag is folded to have a Z-shaped cross section.

11. A method of restraining at least one leg of an occupant of a vehicle, the method comprising:

providing a housing and an airbag that is operable to move between a stowed state and a deployed state, the airbag being housed within the housing in the stowed state, the airbag extending from the housing in the deployed state, the airbag defining a package width when in the stowed state, the airbag defining a deployed width when in a fully deployed state;

stowing the airbag in the housing, wherein the airbag includes a tethered region and at least one side region that is untethered, wherein stowing the airbag includes folding the at least one side region over the tethered region, the at least one side region being unfolded from the tethered region when in the deployed position to partially define the fully deployed width; and moving the airbag from the stowed state to the fully deployed state such that a ratio of the package width to the deployed width is between approximately 0.8 and 1.0.

12. The method of claim 11, wherein the ratio of the package width to the deployed width is between approximately 0.90 and 0.92.

13. The method of claim 11, further comprising mounting the housing to the vehicle, wherein the vehicle defines a vertical direction, wherein the vehicle includes a knee bolster surface with a lowermost edge, wherein mounting the housing to the vehicle includes mounting the housing below the lowermost edge in the vertical direction.

14. The method of claim 13, wherein the vehicle defines a fore/aft direction, and wherein mounting the housing also includes mounting the housing forward of the lowermost edge in the fore-aft direction.

15. The method of claim 11, further comprising mounting the housing to the vehicle, wherein the vehicle defines a vertical direction and a front end, wherein the housing includes a rear face, wherein the airbag moves generally away from the rear face when moving from the stowed position to the deployed position, wherein mounting the housing includes mounting the housing such that the rear face is disposed relative to the vertical direction such that a lower edge of the rear face is disposed closer to the forward end of the vehicle than an upper edge of the rear face.

16. The method of claim 11, wherein the vehicle defines a fore/aft direction, and wherein moving the airbag includes moving the airbag substantially only in the fore/aft direction when initially moving from the stowed position to the deployed position.

17. The method of claim 11, further comprising stowing the airbag in the housing, wherein the airbag defines a fore-aft direction, wherein stowing the airbag includes folding the airbag to have a Z-shaped cross section in the fore-aft direction.

* * * * *